INVENTOR.
Emeric W. Bergere

United States Patent Office 3,276,308
Patented Oct. 4, 1966

3,276,308
BLIND FASTENERS
Emric W. Bergere, 2324 Nottingham Ave.,
Los Angeles, Calif.
Filed Apr. 26, 1965, Ser. No. 450,869
1 Claim. (Cl. 85—72)

This invention relates to means for attaching structural elements to plates or panels, and more specifically to self tightening means for connecting together two elements having registering openings therein by manipulation of the fastener from one side only of said elements.

The present invention relates particularly to a headed, smooth bore, sleeve containing a bolt with a head located at the sleeve end, provided with a threaded portion extending outside of said sleeve head to engage with a tool containing a portable female threaded element.

One object of the invention is to provide a high tensile force on the bolt, by the mechanical advantage of a lead screw, with a rotating tool causing an axial movement of said bolt thru the sleeve, thereby forcing the head of the bolt to enter and expand the hollow end of the sleeve against the structural element.

Another object of the invention is to provide a flush breaking boltshank and to lock it into the sleeve head without recoil forces which would tend to reduce the pre-load induced during the joint pull-up.

According to a further feature of the invention, a tandem series of breaknecks are provided on the bolt shank to produce a fracture flush with top of the sleeve head and to accommodate an extended grip range equal to or higher than presently used high strength blind fasteners.

A further object of the invention is to provide a threaded bolt shank to obtain a high structural joint clamping force without requiring the tapping of the hollow sleeve and so thread fatigue in tension in the installed fastener is absent, and further to improve the shear strength thru a smooth bore sleeve and bolt shank.

The present invention with the threaded bolt shank located outside of the fastener assembly allows for the use of available low cost standard electrical or pneumatic nut drivers for installation tooling.

Other objects and the advantages of the invention will be apparent in the following description taken in conjunction with the accompanying drawings, wherein.

Figure 1:
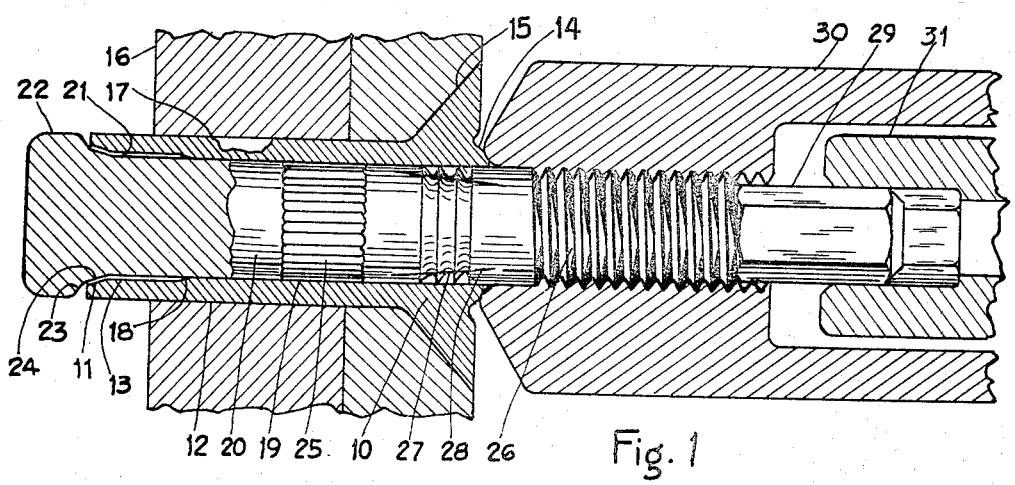
FIG. 1 is an axial cross-sectional view illustrating a flush head fastener and a nut running tool 30 assembled with the structure, in the nominal grip condition, prior to the pull-up operation in accordance with the present invention.

Referring to the drawings by reference characters, I have shown my invention as applied to like parts thruout and where in FIG. 1 the sleeve 10 is illustrated in its initial form with a cylindrical shank 12 adapted to fit in hole 17 of structure 16, an internal chamfer 11 and 18 located in internal passages 13 and 19, a countersink type head 15 containing a collar 14, the bolt 20 has a cylindrical shank 21 to fit snugly in sleeve hole 19, a head 22 with frusto-conical slopes 23 and 24 to engage and enter hole 13, a cylindrical serration 25 on shank 21 with an interference fit in hole 19, to prevent relative rotation between bolt and sleeve, a threaded shank 26 to engage the driving tool, a series of breaknecks 27 along slope 28 for a flush frangible end relative to end of the sleeve head to satisfy the grip range, a hexagonal end section 29 following the threads to retain bolt from rotation.

Figure 2:
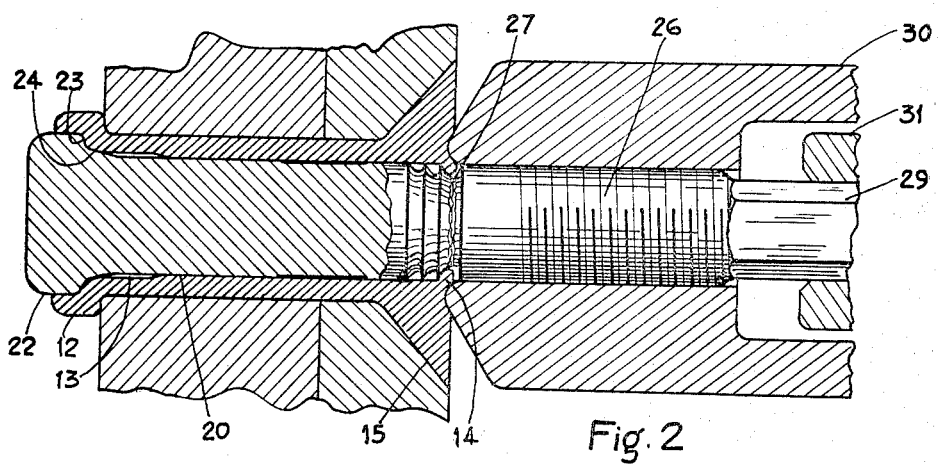
FIG. 2 is a sectional view, similar to FIG. 1, but showing the fastener in the maximum grip condition at the completion of the clamping operation, and the bolt locked by swaging the sleeve head portion into the bolt grooves, but before the final breaking of the bolt neck.

FIG. 2 shows the fastener installed in structure 16 at maximum grip with the axial position of the bolt shank 20 with groove 27 of the breakneck section, partially fractured and having received the swaged collar 14 to lock the bolt shank in the sleeve head 15. The installation tool has a stationary member 31 engaging the hexagon shank 29 of bolt 20 (by means and in a manner not shown) to prevent rotation while revolving nut 30 in the tool axially traverses bolt threads 26 to produce the tensile pull-up of bolt head 22 for the shortest movement in the end of the sleeve cavity 13.

Figure 3:
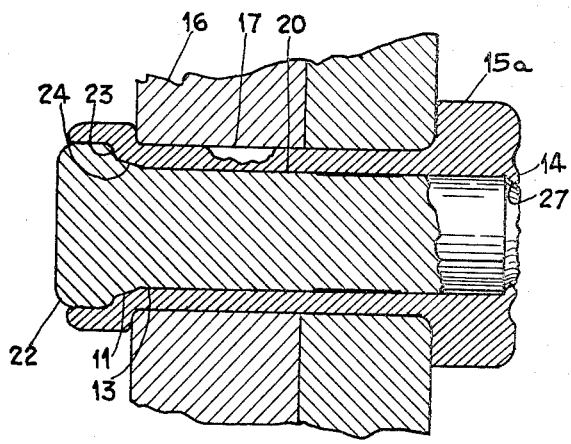
FIG. 3 is a sectional view of the fastener similar to FIG. 2, but with a protruding head, installed in the minimum grip condition.

In FIG. 3 the fastener is fitted in hole 17 in structure 16 which is shown as the minimum grip where tension on the bolt 20 moves head 22 to its deepest point in hole 13, slope 24 contacts chamber 11 flaring sleeve outward causing slope 23 to expand hole 13 so head outside diameter can travel to clamp structure. The combination of slopes 23 and 24 produces stress components to clamp the structure with high pre-loads obtained by the bolt threads and secured between the mushroomed sleeve 12 and head 15a. As the tensile load builds up to elongate the last breakneck groove section 27 the tool presses collar 14 into said groove, locking the bolt shank with the sleeve head for resistance to separation from vibration. The combined tensile pre-load, the groove lock and continued bolt pull produces stresses in the top breakneck to elongate the reduced area and produce the tensile fracture.

The use of this device should be evident from the drawings and their descriptions. The blind bolt is placed loosely or pressed in a hole with tolerances to suit the required fit. Then a rotative tool is applied to the bolt thread producing tension, when the tool touches the sleeve head, drawing the bolt head toward the hollow sleeve. The movement is facilitated by the bolt head bevels acting on the sleeve chamber. After the bolt has pulled the head to where the expanded sleeve abuts the structure, increased tensile resistance presses the sleeve head collar into the bolt breakneck grooves, mechanically locking the two members together. The tension then increases to the point where the elongation of the reduced area of the breakneck groove fails the driving section of the bolt shank to leave a flush-break installed blind bolt.

The entering contour of the bolt head into the tubular sleeve applies upward and outward components to produce a tight joint where the flared sleeve abuts the structure.

This invention is not to be limited by the embodiments shown in the drawings and described in the specification which are given by way of example and not of limitation, but only in accordance with the scope of the following claim.

I claim:

A blind fastener comprising: A tubular sleeve having on its front end portion a formed radially projecting head, said head having an outstanding collar adapted to make driving, surface contact with the drive tool, said sleeve having an axial cylindrical passage extending from end to end thereof, and an internal counterbore to reduce the sleeve wall at the end opposite to the head, said counterbore containing chamfers at either end; a bolt having a head adjacent one end thereof, said head having an inclined undercut in a radial face thereof, a conical cylindrical section on said head contiguous to the radial inclined face and extending to join the smooth cylindrical shank of said bolt, said sleeve cylindrical passage closely fitting the cylindrical shank of the bolt; and a section of serrations adjoining said smooth shank whereby the serrations may hold the bolt from rotation in the sleeve, a series of breakneck grooves so spaced that grip range is obtained, said grooves' diameter progressively diminishing in the direction away from the bolt head to fracture from the applied tension, flush with the top of the sleeve head; and a threaded section following said grooves, that portion being the engaging means to produce a tensile force in said bolt causing the bolt head to draw into the sleeve to form an expanded head to tightly grip the blind side of the structure; and a polygonal end section adjoining the threads to prevent rotation of the bolt when engaged by the driving tool, said tool during the completion of the tensile driving force presses the locking collar into the breakneck grooves to hold sleeve and bolt from vibrating loose; that portion of the bolt engaged by the drive tool being frangibly disconnected by sufficient tensile pull at the top of the sleeve head and discarded.

References Cited by the Examiner

UNITED STATES PATENTS

| | | | |
|---|---|---|---|
| 534,331 | 2/1895 | Hodgson | 85—77 |
| 2,298,203 | 10/1942 | Eklund | 85—74 |
| 2,406,157 | 8/1946 | Nelson | 85—77 |
| 2,795,989 | 6/1957 | Koenig | 85—78 |
| 3,065,661 | 11/1962 | Kolec et al. | 85—78 |
| 3,107,572 | 10/1963 | Orloff | 85—73 |
| 3,203,303 | 8/1965 | Laisy | 85—77 |
| 3,203,818 | 1/1966 | Siebol | 85—72 |
| 3,232,162 | 2/1966 | Ketchum | 85—77 |

CARL W. TOMLIN, *Primary Examiner.*

M. PARSONS, JR., *Assistant Examiner.*